(12) United States Patent
Yamada et al.

(10) Patent No.: US 9,857,102 B2
(45) Date of Patent: Jan. 2, 2018

(54) EJECTOR

(71) Applicant: DENSO CORPORATION, Kariya, Aichi-pref. (JP)

(72) Inventors: Etsuhisa Yamada, Kariya (JP); Haruyuki Nishijima, Obu (JP); Yoshiaki Takano, Kosai (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 163 days.

(21) Appl. No.: 14/382,647

(22) PCT Filed: Feb. 21, 2013

(86) PCT No.: PCT/JP2013/000966
§ 371 (c)(1),
(2) Date: Sep. 3, 2014

(87) PCT Pub. No.: WO2013/132769
PCT Pub. Date: Sep. 12, 2013

(65) Prior Publication Data
US 2015/0033791 A1 Feb. 5, 2015

(30) Foreign Application Priority Data

Mar. 7, 2012 (JP) ................................. 2012-050827

(51) Int. Cl.
*F25B 1/06* (2006.01)
*F04F 5/20* (2006.01)
(Continued)

(52) U.S. Cl.
CPC ............... *F25B 1/06* (2013.01); *F04F 5/20* (2013.01); *F04F 5/46* (2013.01); *F04F 5/48* (2013.01);
(Continued)

(58) Field of Classification Search
CPC ........ F25B 1/06; F25B 41/00; F25B 2500/01; F25B 2341/0012; F04F 5/48; F04F 5/52; F04F 5/20; F04F 5/46
(Continued)

(56) References Cited

U.S. PATENT DOCUMENTS 1,993,478 A * 3/1935 Graham ................. F01B 25/00
165/113
2,882,698 A * 4/1959 Boyle ..................... F25B 41/00
415/121.2
(Continued)

FOREIGN PATENT DOCUMENTS

JP   EP 1160522 A1 * 12/2001 ............... F04F 5/04
JP   3331604 B2    10/2002
(Continued)

OTHER PUBLICATIONS

U.S. Appl. No. 14/373,862, filed Jul. 22, 2014, Yamada et al.
(Continued)

*Primary Examiner* — Ljiljana Ciric
*Assistant Examiner* — Kirstin Oswald
(74) *Attorney, Agent, or Firm* — Harness, Dickey & Pierce, P.L.C.

(57) ABSTRACT

An ejector includes a swirl flow channel that is arranged on an upstream side of a nozzle portion. The swirl flow channel swirls the high pressure refrigerant and allows the refrigerant in a state of a gas-liquid mixed phase to flow into the nozzle portion. The ejector further includes a flow-rate changeable mechanism that is disposed at the upstream side of the swirl flow channel, and is capable of changing a flow rate of the high pressure refrigerant that flows into the swirl flow channel. Accordingly, a nozzle efficiency can be improved, and an operation according to a load of the refrigeration cycle is possible.

10 Claims, 4 Drawing Sheets

(51) Int. Cl.
*F04F 5/46* (2006.01)
*F04F 5/48* (2006.01)
*F04F 5/52* (2006.01)
*F25B 41/00* (2006.01)
*B60H 1/32* (2006.01)

(52) U.S. Cl.
CPC ............... *F04F 5/52* (2013.01); *F25B 41/00* (2013.01); *B60H 2001/3298* (2013.01); *F25B 2341/0012* (2013.01); *F25B 2500/01* (2013.01)

(58) Field of Classification Search
USPC .......................................... 62/500, 510, 512
See application file for complete search history.

(56) References Cited

U.S. PATENT DOCUMENTS

| | | | | | |
|---|---|---|---|---|---|
| 3,007,322 | A | * | 11/1961 | Dodge | F04B 23/12 34/407 |
| 3,598,504 | A | * | 8/1971 | Siravo | F04F 5/48 417/184 |
| 3,701,264 | A | * | 10/1972 | Newton | F25B 41/00 62/191 |
| 3,885,931 | A | * | 5/1975 | Schaller | B04C 3/06 137/812 |
| 4,595,344 | A | * | 6/1986 | Briley | F04F 5/48 239/546 |
| 4,631,004 | A | * | 12/1986 | Mock | F01K 3/185 417/189 |
| 5,343,711 | A | | 9/1994 | Kornhauser et al. | |
| 6,438,993 | B2 | * | 8/2002 | Takeuchi | F04F 5/04 62/191 |
| 6,783,329 | B2 | * | 8/2004 | Vilela | F04F 5/461 137/110 |
| 6,901,770 | B2 | * | 6/2005 | Scaringe | F25B 43/003 62/129 |
| 2001/0020366 | A1 | * | 9/2001 | Cho | B01D 45/16 62/5 |
| 2003/0079495 | A1 | * | 5/2003 | Hotta | F04F 5/04 62/500 |
| 2003/0118455 | A1 | * | 6/2003 | Vilela | F04F 5/461 417/189 |
| 2003/0126883 | A1 | * | 7/2003 | Saito | F25B 41/00 62/500 |
| 2003/0213264 | A1 | * | 11/2003 | Ogata | F04F 5/04 62/500 |
| 2004/0172966 | A1 | * | 9/2004 | Ozaki | F04F 5/04 62/500 |
| 2004/0255611 | A1 | * | 12/2004 | Nishijima | F25B 41/00 62/500 |
| 2005/0178149 | A1 | * | 8/2005 | Ikegami | F25B 41/00 62/500 |
| 2009/0013704 | A1 | * | 1/2009 | Oshitani | F25B 41/00 62/191 |
| 2010/0175422 | A1 | | 7/2010 | Yamada et al. | |
| 2011/0259042 | A1 | | 10/2011 | Nishino et al. | |

FOREIGN PATENT DOCUMENTS

| | | | | |
|---|---|---|---|---|
| JP | EP 1273859 A2 | * | 1/2003 | ............. F25B 41/00 |
| JP | EP 1300639 A1 | * | 4/2003 | ........... B60H 1/3204 |
| JP | 2008202812 A | | 9/2008 | |
| JP | 2008232458 A | | 10/2008 | |
| JP | 2010181136 A | | 8/2010 | |
| JP | 2010210111 A | | 9/2010 | |
| JP | 2011220552 A | | 11/2011 | |

OTHER PUBLICATIONS

Office Action dated May 12, 2015 in corresponding Japanese Applicaiton No. 2012-050827.
International Search Report and Written Opinion (in Japanese with English Translation) for PCT/JP2013/000966, dated May 21, 2013; ISA/JP.
Office Action dated Oct. 30, 2015 issued in the corresponding Chinese application No. 201380013535.6 in Chinese with English translation.

* cited by examiner

EJECTOR

CROSS REFERENCE TO RELATED APPLICATION APPLICATIONS

This application is a U.S. National Phase Application under 35 U.S.C. 371 of International Application No. PCT/JP2013/000966 filed on Feb. 21, 2013 and published in Japanese as WO 2013/132769 A1 on Sep. 12, 2013. This application is based on and claims the benefit of priority from Japanese Patent Application No. 2012-050827 filed on Mar. 7, 2012. The entire disclosures of all of the above applications are incorporated herein by reference.

TECHNICAL FIELD

The present disclosure relates to an ejector which is a momentum transport pump that decompresses a fluid and conducts fluid transport by the aid of a suction action of a working fluid which is ejected at high speed.

BACKGROUND ART

A conventional ejector disclosed in, for example, Patent Document 1 has been known. The ejector of Patent Document 1 includes a nozzle portion that decompresses a refrigerant condensed and liquefied by a refrigerant condenser after having been compressed into a high pressure by a compressor, a suction portion that draws a refrigerant on a lower pressure side, which is ejected from a refrigerant evaporator, and a diffuser portion that mixes the refrigerant ejected from the nozzle portion with the refrigerant drawn from the suction portion for boosting in a refrigeration cycle. The nozzle portion includes a first nozzle that decompresses and expands a liquid refrigerant flowing from the refrigerant condenser, and a second nozzle that again decompresses and expands the refrigerant that put into a gas-liquid two phase by the first nozzle, and ejects the refrigerant.

With the above configuration, the refrigerant is expanded and put into the gas-liquid two-phase by the first nozzle, and further decompressed, and expanded by the second nozzle, thereby being capable of increasing an exit velocity of the refrigerant which flows from the second nozzle, and increasing a nozzle efficiency.

PRIOR ART DOCUMENT

Patent Document

Patent Document 1: Japanese Patent No. 3331604

SUMMARY OF THE INVENTION

However, according to the inventors' study of the present application, in the ejector of Patent Document 1, when a difference in refrigerant pressure between a high pressure side and a low pressure side is small, for example, at the time of a low load of the refrigeration cycle, most of the difference in the refrigerant pressure is reduced by the first nozzle, resulting in such a risk that a pressure energy to be boosted by the diffuser portion is hardly obtained in the second nozzle. That is, a sufficient operation of the ejector, which matches a load of the refrigeration cycle, may not be obtained.

In view of the above problem, an object of the present disclosure is to provide an ejector that improves a nozzle efficiency, and enables operation matching the load of the refrigeration cycle.

According to a first aspect of the present disclosure, an ejector for a vapor compression refrigeration cycle includes a nozzle portion that decompresses and expands a high pressure refrigerant flowing from a high pressure side of the refrigeration cycle, a suction portion that draws a low pressure refrigerant lower in pressure than the high pressure refrigerant by a suction force of an ejected refrigerant ejected from the nozzle portion, and a diffuser portion that is disposed on a downstream side of the nozzle portion in a refrigerant flow direction, has a flow channel that gradually enlarges in cross-sectional area toward the downstream side in the refrigerant flow direction, and decelerates a mixed refrigerant of the ejected refrigerant ejected from the nozzle portion and the low pressure refrigerant drawn from the suction portion to increase a pressure of the refrigerant. The ejector further includes a swirl flow channel that is disposed on the upstream side of the nozzle portion in the refrigerant flow direction, swirls the high pressure refrigerant, and allows the refrigerant in a state of a gas-liquid mixed phase to flow into the nozzle portion, and a flow-rate changeable mechanism that is disposed on the upstream side of the swirl flow channel in the refrigerant flow direction, and is capable of changing a flow rate of the high pressure refrigerant that flows into the swirl flow channel.

According to a second aspect of the present disclosure, the swirl flow channel may be configured to make a larger amount of gas phase refrigerant present on a radially inner side than on a radially outer side with respect to an imaginary swirl center line by swirling the high pressure refrigerant.

Accordingly, the swirl flow channel swirls the high pressure refrigerant so that a larger amount of gas phase refrigerant is present on a radially inner side than on a radially outer side with respect to the swirl center line. In fact, in the swirl flow channel, the refrigerant is put into a two-phase separation state in which the refrigerant in the vicinity of the swirl center line is a gas single phase, and the refrigerant around the vicinity thereof is a liquid single phase. Since boiling (gasification) of the liquid refrigerant is accelerated on "a gas-liquid interface generated by the two-phase separation state", the flow is put into a two-phase spray state, and accelerated to a two-phase sound speed in the vicinity of a minimum flow channel area portion of the nozzle portion. Further, the refrigerant accelerated to the two-phase sound speed is capable of continuing to be an ideal two-phase spray flow from the minimum flow channel area portion of the nozzle portion to an exit of a divergent flow channel portion, and is capable of increasing a flow rate of the refrigerant ejected at the exit of the divergent flow channel portion. Hence, a nozzle efficiency of the nozzle portion can be improved, as a result of which the ejector efficiency can be improved.

Also, since the flow-rate changeable mechanism capable of changing a flow rate of the liquid phase refrigerant flowing into the swirl flow channel is provided, a refrigerant flow rate changes according to a load of the refrigeration cycle so that the amount of refrigerant according to the load of the refrigeration cycle is capable of flowing therein to bring out the effective operation of the ejector.

If the flow rate of the liquid phase refrigerant increases with the aid of the flow-rate changeable mechanism when the load of the refrigeration cycle is high, the flow channel of the flow-rate changeable mechanism is largely opened, and functions as an ejector of a single-stage expansion caused by the nozzle portion, as the ejector. Conversely, if the flow rate of the liquid phase refrigerant decreases with the aid of the flow-rate changeable mechanism when the load of the refrigeration cycle is low, the flow channel of the flow-rate changeable mechanism is closed as an iris, and functions as an ejector of a double-stage expansion caused by a flow channel closed as the iris, and an original nozzle portion, as the ejector.

In the present disclosure, since the flow rate of the refrigerant ejected at the exit of the divergent flow channel portion of the nozzle portion is increased by the swirl flow channel described above, the nozzle efficiency can be improved. For that reason, the excellent operation of the ejector is obtained as compared with a case in which the pressure energy to be boosted by the diffuser portion is hardly obtained in the second nozzle due to the decompression of the first nozzle at the time of the low load.

According to a third aspect of the present disclosure, the high pressure refrigerant may be a liquid phase refrigerant.

If the high pressure refrigerant is the liquid phase refrigerant, the refrigerant is put into the two-phase separation state in which the refrigerant in the vicinity of the swirl center line is the gas single phase, and the refrigerant around the vicinity thereof is the liquid single phase in the swirl flow channel as described above. Since the boiling (gasification) of the liquid refrigerant is accelerated on "the gas-liquid interface generated by the two-phase separation state", the flow from the minimum flow channel area portion of the nozzle portion to the exit of the divergent flow channel portion is put into the two-phase spray state, and the effect of an increase in the refrigerant flow rate at the exit of the divergent flow channel portion is surely obtained. The above effect is larger than that when the high pressure refrigerant is the gas-liquid two-phase.

According to a fourth aspect of the present disclosure, the flow-rate changeable mechanism may be configured so that the high pressure refrigerant flows into the flow-rate changeable mechanism in parallel to an axis of the nozzle portion.

According to the above configuration, the swirl flow channel and the flow-rate changeable mechanism can be connected to each other in an axial direction of the swirl flow channel, and the flow-rate changeable mechanism is not protruded in a direction orthogonal to the axial direction of the swirl flow channel, as a result of which the ejector excellent in mountability can be provided.

According to a fifth aspect of the present disclosure, the flow-rate changeable mechanism may include at least one guide member that guides the high pressure refrigerant flowing into the flow-rate changeable mechanism in a swirl direction of the swirl flow channel. The guide member may have a guide flow channel that extends in the swirl direction. The guide member is capable of changing the flow rate of the high pressure refrigerant flowing into the swirl flow channel by changing a cross-sectional area of the guide flow channel.

According to the above configuration, the flow-rate changeable mechanism that subjects the inflow refrigerant to swirl flow while adjusting the flow rate of the high pressure refrigerant can be provided, and the flow-rate changeable mechanism can be made compact.

According to a sixth aspect of the present disclosure, the guide member may include a fixed guide and a movable guide. The guide flow channel may be provided between the fixed guide and the movable guide. The movable guide may be driven to change a gap between the fixed guide and the movable guide to change the cross-sectional area of the guide flow channel.

According to a seventh aspect of the present disclosures, the flow-rate changeable mechanism may include a plurality of the guide members, and the plurality of guide members may be arranged along the swirl direction of the swirl flow channel.

According to an eighth aspect of the present disclosure, the flow-rate changeable mechanism may include a pair of the guide members, and the pair of guide members may be arranged along the swirl direction of the swirl flow channel to face each other.

According to a ninth aspect of the present disclosure, the guide member may be located within the swirl flow channel.

According to a tenth aspect of the present disclosure, the swirl flow channel may be arranged between the flow-rate changeable mechanism and the nozzle portion in a direction of the axis of the nozzle portion.

EMBODIMENTS FOR EXPLOITATION OF THE INVENTION

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 1:
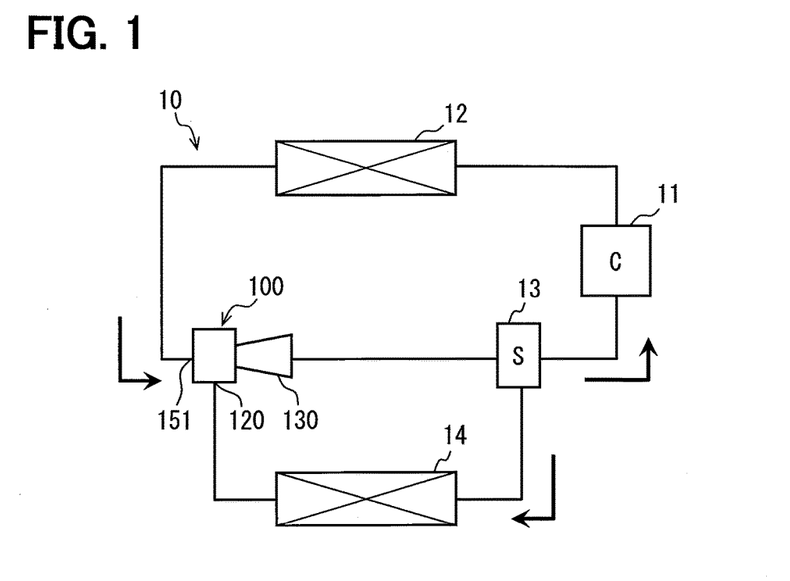
FIG. 1 is a schematic diagram illustrating a refrigeration cycle according to a first embodiment of the present disclosure.
Figure 2:
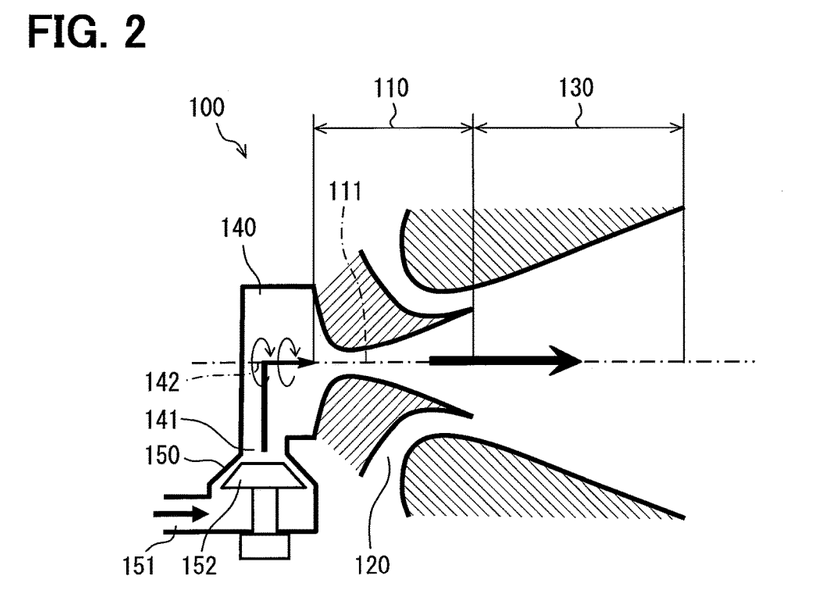
FIG. 2 is a schematic cross-sectional view illustrating an ejector according to the first embodiment.

FIGS. 1 and 2 illustrate a configuration in which an ejector 100 according to a first embodiment is applied to a vapor compression refrigeration cycle (hereinafter referred to as "refrigeration cycle") 10. The refrigeration cycle 10 is mounted on a vehicle as an air conditioning system, and formed so that a compressor 11, a condenser 12, an ejector 100, a gas-liquid separator 13, and an evaporator 14 are connected to each other by a refrigerant piping. The operation of the compressor 11 and the ejector 100 (flow-rate changeable mechanism 150) are controlled by a control device not shown.

The compressor 11 is a fluid machine that draws a gas phase refrigerant within the gas-liquid separator 13 (reservoir portion), compresses the gas phase refrigerant to a high-temperature and high-pressure refrigerant, and discharges the refrigerant to the condenser 12 side. The compressor 11 is rotationally driven by a vehicle travel engine through an electromagnetic clutch and a belt which are not shown. The compressor 11 is configured by, for example, a swash plate type variable displacement compressor that inputs a control signal from the control device to an electromagnetic displacement control valve to make a discharge capacity variable. The compressor 11 may be configured by an electric compressor rotationally driven by an electric motor. In the case of the electric compressor, the discharge capacity can be varied by a rotating speed of the electric motor.

The condenser 12 is a heat exchanger that exchanges heat between a high pressure refrigerant discharged from the compressor 11, and an exterior air (hereinafter referred to as "outside air") which is forcedly blown by a cooling fan not shown, thereby discharging (cooling) the heat of the high pressure refrigerant to the outside air to condense and liquefy the refrigerant. When the pressure of the refrigerant compressed by the compressor 11 exceeds a critical pressure, the refrigerant is not condensed and liquefied even if the refrigerant is cooled, and in this case, the condenser 12 functions as a radiator that cools the high pressure refrigerant. A refrigerant outflow side of the condenser 12 is connected to an inflow portion 151 (details will be described later) of the ejector 100.

The ejector 100 functions as a decompression unit that decompresses a liquid phase refrigerant (high pressure refrigerant) that flows out of the condenser 12, and also functions as a refrigerant circulation unit for fluid transport which circulates the refrigerant by a suction action (entrainment action) of a refrigerant flow ejected at high speed. As illustrated in FIG. 2, the ejector 100 includes a nozzle portion 110, a suction portion 120, a diffuser portion 130, a swirl flow channel 140, and a flow-rate changeable mechanism 150.

The nozzle portion 110 takes in the liquid phase refrigerant that flows out of the condenser 12 through the flow-rate changeable mechanism 150 and the swirl flow channel 140 which will be described later, narrows down a passage area toward a downstream side of the refrigerant flow to convert the pressure energy of the refrigerant into a velocity energy, and decompresses and expands the refrigerant in an isentropic manner. The nozzle portion 110 includes a tapered portion in which the flow channel is tapered toward the downstream side, and a divergent portion that is arranged at the downstream side of the tapered portion in which the flow channel is enlarged toward the downstream side. A part where the tapered portion and the divergent portion are connected to each other forms a nozzle throat in which the flow channel area is most reduced. An imaginary axis along a refrigerant flow direction of the nozzle portion 110 is defined as an axis 111.

The suction portion 120 is a flow channel extending in a direction intersecting with the nozzle portion 110, and arranged to communicate with a refrigerant ejection port (outlet of the divergent portion) of the nozzle portion 110 from an external of the ejector 100. The suction portion 120 is connected to a refrigerant outlet side of the evaporator 14.

The diffuser portion 130 is disposed at the downstream side of the nozzle portion 110 and the suction portion 120 in a flow direction of the refrigerant. The diffuser portion 130 mixes the refrigerant (ejected refrigerant) at high speed which is ejected from the nozzle portion 110 with the gas phase refrigerant (low pressure refrigerant) from the suction portion 120 (evaporator 14), decelerates a flow of the mixed refrigerant thus mixed, and converts the speed energy into the pressure energy for boosting. The diffuser portion 130 is formed into a shape (so-called diffuser shape) in which a cross-sectional area of the refrigerant passage gradually increases toward the downstream side to provide the above-mentioned pressure-boosting function. The diffuser portion 130 is connected to the gas-liquid separator 13.

The swirl flow channel 140 is arranged at the upstream side of the nozzle portion 110 in the flow direction of the refrigerant, and swirls the liquid phase refrigerant that flows out of the condenser 12. With the above configuration, in the swirl flow channel 140, a larger amount of gas phase refrigerant is present on the radially inner side than on the radially outer side with respect to an imaginary center line (hereinafter referred to as "swirl center line") of a swirl flow. The refrigerant of a gas-liquid mixed phase state flows into the nozzle portion 110 from the swirl flow channel 140. The swirl flow channel 140 is, for example, a flow channel having a flat cylindrical internal space. A pipe-like (linear) inflow portion 141 that communicates with the swirl flow channel 140 is connected tangentially to an outer periphery of the cylindrical swirl flow channel 140. In this example, if an imaginary axis of the cylindrical swirl flow channel 140 is defined as an axis 142, the swirl flow channel 140 is arranged with respect to the nozzle portion 110 so that the axis 142 becomes parallel to the axis 111. More specifically, the swirl flow channel 140 is arranged with respect to the nozzle portion 110 so that the axis 142 is identical with the axis 111. The swirl flow channel 140 is connected to communicate with the nozzle portion 110.

In this example, in the swirl flow channel 140, in order to allow a larger amount of gas phase refrigerant to be present on the radially inner side with respect to the swirl center line, there is a need to sufficiently increase the swirl flow rate of the refrigerant. For that reason, a ratio A of a flow channel cross-sectional area of the inflow portion 141 to a flow channel cross-sectional area of the nozzle throat, and a ratio B of a flow channel cross-sectional area of the swirl flow channel 140 to the flow channel cross-sectional area of the nozzle throat are each set to a predetermined value.

The flow-rate changeable mechanism 150 is a mechanical portion that is capable of changing the flow rate of the liquid phase refrigerant which flows into the swirl flow channel 140, and arranged at the upstream side of the swirl flow channel 140. Specifically, the flow-rate changeable mechanism 150 is arranged in parallel to the refrigerant flow direction (direction intersecting with the axis 142) of the inflow portion 141 on a tip side of the inflow portion 141. The flow-rate changeable mechanism 150 includes the inflow portion 151, and a valve body 152 disposed in a space formed between the inflow portion 151 and the inflow portion 141. The inflow portion 151 is disposed on the most upstream portion of the flow-rate changeable mechanism 150, and arranged so that the refrigerant flow direction is parallel to the axes 111 and 142. An upstream side of the inflow portion 151 is connected to the refrigerant outflow side of the condenser 12 so that the liquid phase refrigerant that flows out of the condenser 12 flows into the inflow portion 151.

The valve body 152 is designed to adjust an opening area of the inflow portion 141 in the swirl flow channel 140, and slid in the refrigerant flow direction of the inflow portion 141 by a control device not shown so as to change the opening area of the inflow portion 141. The valve body 152 includes, for example, an umbrella-shaped valve, an actuating bar that is connected to the valve, and an actuator that slides the actuating bar, and the actuating bar extends in parallel to the refrigerant flow direction of the inflow portion 141.

Returning to FIG. 1, the gas-liquid separator 13 is a separator that separates the refrigerant which flows out of the diffuser portion 130 of the ejector 100 into two phases of gas and liquid. The gas-liquid separator 13 is configured by a cylindrical container body that is formed integrally with the reservoir portion that stores the separated gas-liquid two-phase refrigerant therein. In the refrigerant that has been separated into the two phases of gas and liquid, the liquid phase refrigerant is stored in an inner lower side of the reservoir portion, and the gas phase refrigerant is also stored in an upper side of the liquid phase refrigerant within the reservoir portion. A part of the reservoir portion in which the liquid phase refrigerant is stored is connected to the refrigerant inflow side of the evaporator 14 by a refrigerant piping. Also, a part of the reservoir portion in which the gas phase refrigerant is stored is connected to an intake side of the compressor 11 by a refrigerant piping.

The evaporator 14 is a heat exchanger that evaporates the refrigerant flowing therein due to an action of absorbing heat from the outside air introduced into an air conditioning case of the air conditioning system by a blower, or the interior air (hereinafter referred to as "inside air"). The refrigerant outflow side of the evaporator 14 is connected to the suction portion 120 of the ejector 100 by a refrigerant piping.

The control device not shown includes a known microcomputer having a CPU, a ROM, and a RAM, and a peripheral circuit thereof. The control device is designed to receive various operation signals (air conditioning operation switch, set temperature switch, etc.) from an operation panel (not shown) by a passenger, and detection signals from various sensor groups. The control device controls the operation of various devices (mainly, compressor 11 and flow-rate changeable mechanism 150) with the execution of various calculations and processing on the basis of a control program stored within the ROM by using those input signals.

Subsequently, the operation of the present embodiment based on the above configuration will be described.

When signals of the air conditioning operation switch and the set temperature switch are input by the passenger to the control device, the control signal output from the control device is supplied to an electromagnetic clutch of the compressor 11 to put the electromagnetic clutch into a connection state, and a rotational driving force is transmitted to the compressor 11 from a vehicle travel engine. When the compressor 11 is an electric compressor, an electric motor operates, and the rotational driving force is transmitted to the compressor 11 from the electric motor.

When a control current In (control signal) is output from the control device to the electromagnetic displacement control valve of the compressor 11 on the basis of the control program, the discharge capacity of the compressor 11 is adjusted, and the compressor 11 draws, compresses, and discharges the gas phase refrigerant from the gas-liquid separator 13 (reservoir portion).

The gas phase refrigerant of high temperature and high pressure which has been compressed and discharged from the compressor 11 flows into the condenser 12. In the condenser 12, the refrigerant of high temperature and high pressure is cooled by the outside air, and condensed and liquefied. The liquid phase refrigerant that has flowed out of the condenser 12 flows into the flow-rate changeable mechanism 150 from the inflow portion 151 of the ejector 100.

In the flow-rate changeable mechanism 150, a position (opening area of the inflow portion 141) of the valve body 152 is adjusted according to a load of the refrigeration cycle 10 by the control device to adjust the amount of refrigerant that flows into the swirl flow channel 140. That is, when the load of the refrigeration cycle 10 is higher, the valve body 152 moves to a lower side of FIG. 2, and the opening area of the inflow portion 141 in the swirl flow channel 140 changes to become larger to increase the amount of refrigerant that flows into the swirl flow channel 140. Conversely, when the load of the refrigeration cycle 10 is lower, the valve body 152 moves to an upper side of FIG. 2, and the opening area of the inflow portion 141 in the swirl flow channel 140 changes to become smaller to decrease the amount of refrigerant that flows into the swirl flow channel 140.

The liquid phase refrigerant that has been adjusted in the flow rate by the flow-rate changeable mechanism 150, and flowed into the swirl flow channel 140 from the inflow portion 141 as described above becomes a swirl flow that swirls around the axis 142 within the swirl flow channel 140 because the inflow portion 141 is connected tangentially to the cylindrical outer periphery of the swirl flow channel 140. In this case, the swirl flow center line is substantially identical with the axis 142. In the swirl flow of this type, a pressure in the vicinity of the swirl center line is reduced to a pressure under which the refrigerant is decompressed and boiled (cavitation is generated) by the action of centrifugal force, to thereby bring into a two-phase separation state in which the refrigerant in the vicinity of the swirl center line is gas single phase, and the refrigerant around the vicinity thereof is liquid single phase. Since the axis 142 of the swirl flow channel 140 and the axis 111 of the nozzle portion 110 are arranged to be identical with each other, the refrigerant of the gas single phase and the liquid single phase flows into the nozzle portion 110 as the refrigerant of the gas-liquid mixed phase state.

In the nozzle portion 110, the refrigerant is decompressed and expanded. Since the pressure energy of the refrigerant is converted into the velocity energy at the time of decompressing and expanding the refrigerant, the refrigerant of the gas-liquid mixed phase state is ejected from the nozzle portion 110 at high speed. With the refrigerant suction action of the refrigerant ejection flow, the liquid phase refrigerant within the gas-liquid separator 13 (reservoir portion) flows within the evaporator 14, is converted into the gas phase refrigerant, and drawn into the suction portion 120.

In this example, the refrigerant is brought into the two-phase separation state in which the refrigerant in the vicinity of the swirl center line is gas single phase, and the refrigerant around the vicinity thereof is liquid single phase in the swirl flow channel 140 as described above. As a result, since the boiling (gasification) of the liquid refrigerant is promoted on "the gas-liquid interface generated by the two-phase separation state", the flow from the tip portion of the nozzle portion 110 to the exit of the divergent portion thereof is put into the two-phase spray state, and thus the flow rate of the refrigerant ejected from the exit of the divergent portion increases.

The refrigerant ejected from the nozzle portion 110 and the refrigerant drawn into the suction portion 120 are mixed together, and flow into the diffuser portion 130 at the downstream side of the nozzle portion 110. Because the velocity energy of the refrigerant is converted into the pressure energy due to the passage area enlarged toward the downstream side in the diffuser portion 130, the pressure of the refrigerant rises.

The refrigerant that has flowed from the diffuser portion 130 flows into the gas-liquid separator 13. The refrigerant that has been separated into the two phases of gas and liquid by the gas-liquid separator 13 flows into the reservoir portion. The gas phase refrigerant within the reservoir portion is drawn into the compressor 11, and again compressed. In this situation, since the pressure of the refrigerant drawn into the compressor 11 rises by the diffuser portion 130 of the ejector 100, a drive power of the compressor 11 can be reduced.

Also, in the refrigerant separated into the two phases of gas and liquid by the gas-liquid separator 13, the liquid phase refrigerant flows into the evaporator 14 from the reservoir portion due to the refrigerant suction action of the ejector 100. In the evaporator 14, the liquid phase refrigerant of the low pressure absorbs heat from air-conditioning air (outside air or inside air) within the air conditioning case, and is evaporated. That is, the air-conditioning air within the air conditioning case is cooled. The gas phase refrigerant that has passed through the evaporator 14 is drawn by the ejector 100, and flows out of the diffuser portion 130.

As described above, in the present embodiment, since the swirl flow channel 140 is disposed in the ejector 100, the liquid phase refrigerant swirls into the two-phase separation state in which the refrigerant in the vicinity of the swirl center line is gas single phase, and the refrigerant around the vicinity thereof is liquid single phase in the swirl flow channel 140. Since the boiling (gasification) of the liquid refrigerant is accelerated on "the gas-liquid interface generated by the two-phase separation state", the flow from the tip portion (the minimum flow channel area portion) of the nozzle portion 110 to the exit of the divergent portion (the divergent flow channel portion) is put into the two-phase spray state. With the above configuration, the flow rate of the refrigerant ejected from the exit of the divergent portion increases. The efficiency (nozzle efficiency) of the nozzle portion 110 in the ejector 100 is proportional to the velocity of the ejected refrigerant. As a result, the nozzle efficiency of the nozzle portion 110 can be improved, as a result of which the ejector efficiency can be improved.

Also, since the flow-rate changeable mechanism 150 capable of changing the flow rate of the liquid phase refrigerant flowing into the swirl flow channel 140 is disposed on the upstream side of the swirl flow channel 140, the amount of refrigerant can be changed according to the load of the refrigeration cycle 10. The amount of refrigerant that matches the load of the refrigeration cycle 10 can be made to flow therein. Thus, the effective operation of the ejector 100 can be brought out.

If the flow rate of the liquid phase refrigerant increases with the aid of the flow-rate changeable mechanism 150 when the load of the refrigeration cycle 10 is high, the flow channel (the inflow portion 141) in the valve body 152 of the flow-rate changeable mechanism 150 is largely opened, and functions as an ejector of a single-stage expansion caused by the nozzle portion 110, as the ejector 100. Conversely, if the flow rate of the liquid phase refrigerant decreases with the aid of the flow-rate changeable mechanism 150 when the load of the refrigeration cycle 10 is low, the flow channel (the inflow portion 141) in the valve body 152 of the flow-rate changeable mechanism 150 is closed as an iris, and functions as an ejector of a double-stage expansion caused by a flow channel closed as the iris, and the original nozzle portion 110, as the ejector 100.

In the present embodiment, the flow rate of the refrigerant ejected at the exit of the divergent portion of the nozzle portion 110 increases with the swirl flow channel 140 described above, thereby being capable of improving the nozzle efficiency. For that reason, the excellent operation of the ejector is obtained as compared with a case in which the pressure energy to be boosted by the diffuser portion is hardly obtained in the second nozzle at the time of the low load due to the decompression of the first nozzle.

Also, the high pressure refrigerant that flows in the ejector 100 (the swirl flow channel 140) is the liquid phase refrigerant in the present embodiment. If the high pressure refrigerant is the liquid phase refrigerant, the refrigerant is put into the two-phase separation state in which the refrigerant in the vicinity of the swirl center line is the gas single phase, and the refrigerant around the vicinity thereof is the liquid single phase in the swirl flow channel 140 as described above. Since the boiling (gasification) of the liquid refrigerant is promoted on "the gas-liquid interface generated by the two-phase separation state", the flow from the tip portion of the nozzle portion 110 toward the exit of a divergent portion 112 is put into the two-phase spray state, and the flow rate of the refrigerant ejected from the exit of the divergent portion 112 increases. As a result, the nozzle efficiency is more improved as compared with a case in which the high pressure refrigerant is the gas-liquid two-phase.

Second Embodiment

Figure 3:
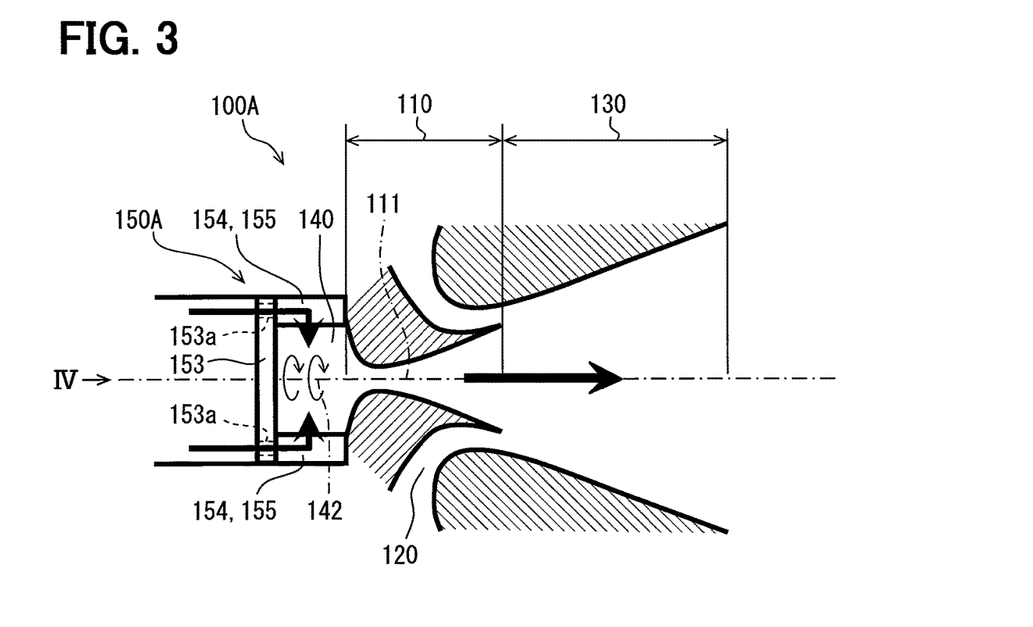
FIG. 3 is a schematic cross-sectional view illustrating an ejector according to a second embodiment of the present disclosure.
Figure 4:
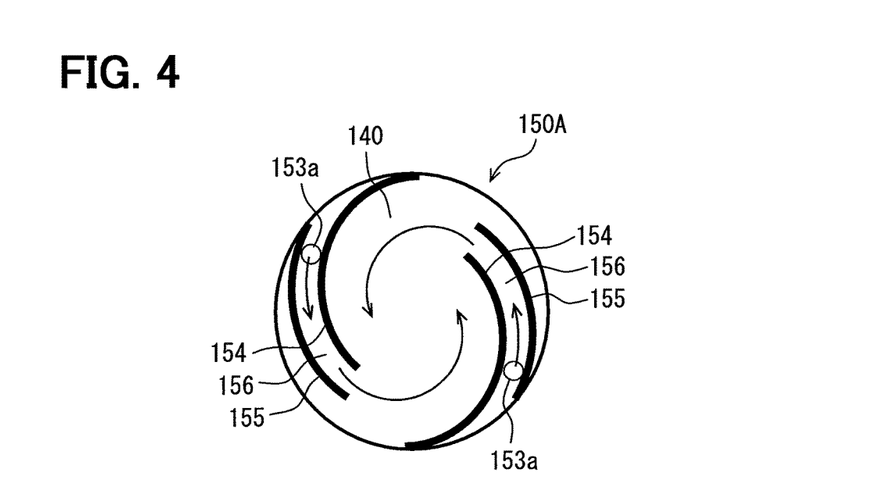
FIG. 4 is a schematic diagram viewed in the direction of an arrow IV in FIG. 3.

An ejector 100A according to a second embodiment is illustrated in FIGS. 3 and 4. The ejector 100A according to the second embodiment changes the structure of the flow-rate changeable mechanism 150 connected to the swirl flow channel 140 in the ejector 100 of the first embodiment into a flow-rate changeable mechanism 150A.

The swirl flow channel 140 is formed so that an upstream side of a flat cylindrical shape is opened. In other words, a side surface of the swirl flow channel 140 opposite to the nozzle portion 110 is opened. The opening portion forms an inflow portion of the swirl flow channel 140.

The flow-rate changeable mechanism 150A includes a substrate 153, first valve body guides 154 (fixed guides), and second valve body guides 155 (movable guides). The substrate 153 is formed of a disc-shaped plate member, and arranged to stop an opening portion at the upstream side of the swirl flow channel 140. That is, the swirl flow channel 140 is located between the flow-rate changeable mechanism 150A and the nozzle portion 110 in the direction of the axes 111 and 142. The center axis of the substrate 153 overlaps in alignment with the axes 111 and 142. Plural inflow holes 153a functioning as an inflow portion into which the refrigerant flows are pieced in the substrate 153, and the inflow holes 153a penetrate through the substrate 153, and communicate with the interior of the swirl flow channel 140. For example, two of the inflow holes 153a are provided on an outer diameter side of the substrate 153 in a circumferential direction. The plural inflow holes 153a are arranged to face each other in a radial direction of the substrate 153.

The first valve body guides 154 are each formed of a rectangular plate member having a thickness to some degree, formed to curve in an arc shape, and inserted into the swirl flow channel 140. One curved side of four sides of a rectangle configuring a curved plane of the first valve body guide 154 is abutted against the substrate 153, and the curved plane erects on the substrate 153. In other words, the first valve body guide 154 is abutted against the substrate 153 so that the curved plane of the first valve body guide 153 intersects with the surface of the substrate 153. Also, the first valve body guides 154 are arranged in correspondence with the positions of the plural inflow holes 153a. For example, the curved surface of each first valve body guide 154 outside of the swirl flow channel 140 in the circumferential direction is adjacent to an edge of the inflow hole 153a inside of the swirl flow channel 140 in the circumferential direction. Two of the first valve body guides 154 are disposed in correspondence with the two inflow holes 153a. In each of the first valve body guides 154, one end side of an outer surface (convex surface) of the curved surface is abutted against an inner peripheral surface of a wall that partitions the swirl flow channel 140, and the curved surface extends along the inner peripheral surface of the wall that partitions the swirl flow channel 140. The other end side of the curved surface deviates from the inner peripheral surface of the wall that partitions the swirl flow channel 140 toward a center side thereof. In other words, the first valve body guides 154 each extend in a direction away from the inner peripheral surface of the wall that partitions the swirl flow channel 140 inward. The first valve body guides 154 are fixed within the swirl flow channel 140 so as to satisfy the above-mentioned positional relationship.

On the other hand, the second valve body guides 155 are each formed of the same curved plate member as that of the first valve body guide 154, and inserted into the swirl flow channel 140 while being paired with the first valve body guide 154. In the present embodiment, since the two first valve body guides 154 are set, two pairs of valve body guides 154 and 155 are provided. The inflow hole 153a is located between the second valve body guide 155 and the corresponding first valve body guide 154. That is, the second valve body guides 155 erect on the substrate 153 so that a guide flow channel 156 (gap) can be formed between both of the paired valve body guides 154 and 155. The guide flow channel 156 extends in the swirl direction of the swirl flow channel 140. As with the first valve body guides 154, one end side of an outer surface (convex surface) of the curved surface of each second valve body guide 155 is abutted against an inner peripheral surface of a wall that partitions the swirl flow channel 140, and the curved surface extends along the inner peripheral surface of the wall that partitions the swirl flow channel 140. The other end side of the curved surface deviates from the inner peripheral surface of the wall that partitions the swirl flow channel 140 toward a center side thereof. The second valve body guides 155 also each extend in a direction away from the inner peripheral surface of the wall that partitions the swirl flow channel 140 inward. A gap formed between both of the paired valve body guides 154 and 155 forms a flow channel of the liquid phase refrigerant that flows into the swirl flow channel 140 from the corresponding inflow hole 153a. The second valve body guides 155 are movable in the circumferential direction of the swirl flow channel 140 with respect to the swirl flow channel 140 and the substrate 153 by a control device not shown.

That is, when the second valve body guide 155 moves in the circumferential direction away from the first valve body guide 154 according to a heat load of the refrigeration cycle 10 by the control device, the gap between both of the paired valve body guides 154 and 155 expands to enlarge the flow channel area of the liquid phase refrigerant which flows from the corresponding inflow hole 153a. That is, when the second valve body guide 155 moves in a direction away from the corresponding first valve body guide 154, the cross-sectional area of the guide flow channel 156 enlarges. Conversely, when the second valve body guide 155 moves closer to the first valve body guide 154 in the circumferential direction, the gap between both of the paired valve body guides 154 and 155 is narrowed to reduce the flow channel area of the liquid phase refrigerant that flows out of the corresponding inflow hole 153a. That is, when the second valve body guide 155 moves in a direction closer to the first valve body guide 154, the cross-sectional area of the corresponding guide flow channel 156 is reduced. The first valve body guides 154 and the second valve body guides 155 may be used as an example of the guide member that guides the inflow high pressure refrigerant in the swirl flow channel 140 in the swirl direction.

In the ejector 100A of the second embodiment, the liquid phase refrigerant that has flowed out of the condenser 12 flows into the flow-rate changeable mechanism 150A and the swirl flow channel 140 through the inflow holes 153a from a direction parallel to the axes 111 and 142. In this situation, the position of the second valve body guide 155 moves according to the heat load of the refrigeration cycle 10 by the control device, as a result of which the flow channel area between both of the paired valve body guides 154 and 155 is adjusted to adjust the amount of refrigerant that flows into the swirl flow channel 140 from the flow-rate changeable mechanism 150A. That is, when the load of the refrigeration cycle 10 is higher, the flow channel area between both of the paired valve body guides 154 and 155 changes to become larger by the operation of the second valve body guide 155 to increase the amount of refrigerant that flows into the swirl flow channel 140. Conversely, when the load of the refrigeration cycle 10 is lower, the flow channel area between both of the paired valve body guides 154 and 155 changes to become smaller by the operation of the second valve body guide 155 to decrease the amount of refrigerant that flows into the swirl flow channel 140.

The liquid phase refrigerant that is adjusted in the flow rate by the flow-rate changeable mechanism 150A (valve body guides 154, 155), and flows into the swirl flow channel 140 from the inflow holes 153a as described above flows along the curved faces of the valve body guides 154 and 155, and is put into the swirl flow that swirls around the axis 142. The valve body guides 154 and 155 have a function of adjusting the opening areas of the inflow holes 153a to make the flow rate changeable in the flow-rate changeable mechanism 150A, and a function of putting the refrigerant flow into the swirl flow in the swirl flow channel 140. A flow of the refrigerant flowing from the swirl flow channel 140 to the nozzle portion 110 and the diffuser portion 130 is identical with that in the first embodiment.

According to the present embodiment, since the inflow direction of the liquid phase refrigerant into the flow-rate changeable mechanism 150A is identical with the direction of the respective axes 142 and 111 of the swirl flow channel 140 and the nozzle portion 110, the ejector 100A can be provided which is excellent in mountability in which the swirl flow channel 140 and the flow-rate changeable mechanism 150A can be connected to each other in the direction of the axis 142 so that the flow-rate changeable mechanism 150A does not protrude in a direction intersecting with the direction of the axis 142 of the swirl flow channel 140.

Also, the flow-rate changeable mechanism 150A changes the gap (the cross-sectional area of the guide flow channel 156) between the pair of valve body guides 154 and 155 that guide the inflow liquid phase refrigerant in the swirl direction to make the flow rate of the liquid phase refrigerant changeable. With the above configuration, the flow-rate changeable mechanism 150A that subjects the inflow refrigerant to swirl flow while adjusting the flow rate of the liquid phase refrigerant can be provided, and the flow-rate changeable mechanism 150A can be made compact.

Third Embodiment

Figure 5:
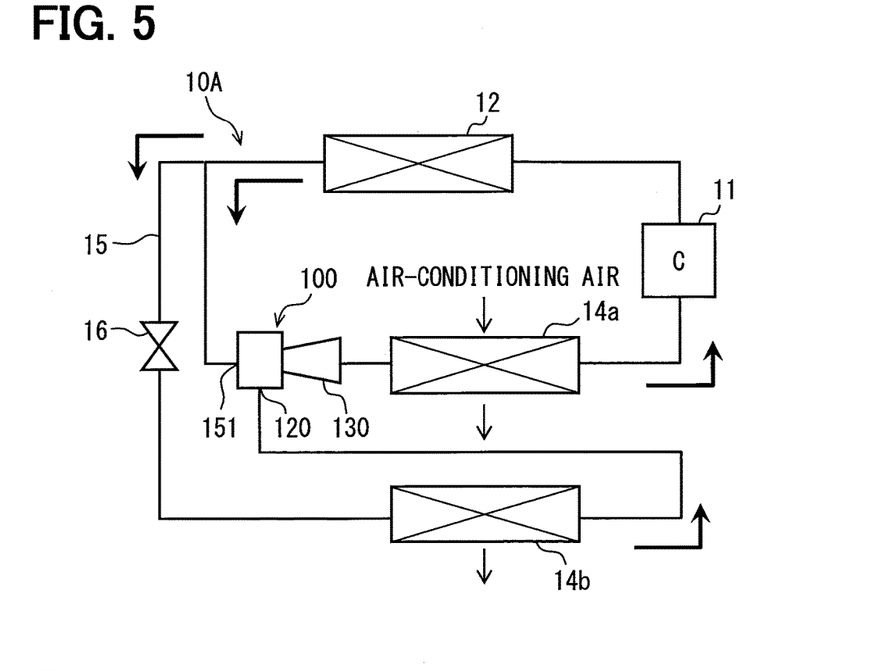
FIG. 5 is a schematic diagram illustrating a refrigeration cycle according to a third embodiment of the present disclosure.

A refrigeration cycle 10A according to a third embodiment is illustrated in FIG. 5. The refrigeration cycle 10A according to the third embodiment eliminates the gas-liquid separator 13 in the refrigeration cycle 10 of the above first embodiment, divides the evaporator 14 into a first evaporator 14a and a second evaporator 14b, and provides a decompressor 16 in a branch flow channel 15. The ejector 100 of the above first embodiment is used in the refrigeration cycle 10A.

The diffuser portion 130 in the ejector 100 is connected to a refrigerant inflow side of the first evaporator 14a, and a refrigerant outflow side of the first evaporator 14a is connected to an intake side of the compressor 11. Also, the branch flow channel 15 is formed as a flow channel which branches from between a refrigerant outflow side of the condenser 12 and the inflow portion 151 of the ejector 100, and is connected to the suction portion 120 of the ejector 100. The branch flow channel 15 is equipped with the decompressor 16 as a decompression unit for the refrigerant flowing from the upstream side toward the downstream side, and the second evaporator 14b.

The first evaporator 14a is arranged at the upstream side of the blown air-conditioning air, and the second evaporator 14b is arranged at the downstream side of the air-conditioning air.

In the present embodiment, a part of the liquid phase refrigerant that flows out of the condenser 12 is adjusted in the flow rate by the flow-rate changeable mechanism 150 of the ejector 100, swirled by the swirl flow channel 140, decompressed by the nozzle portion 110, and also boosted by the diffuser portion 130 and flows out. The refrigerant that flows out of the diffuser portion 130 flows into the first evaporator 14a, and absorbs heat from the air-conditioning air to evaporate the refrigerant. That is, the air-conditioning air within the air conditioning case is cooled. Then, the refrigerant that has passed through the first evaporator 14a is drawn into the compressor 11.

Also, the remainder of the liquid phase refrigerant that flows out of the condenser 12 flows into the branch flow channel 15, is decompressed by the decompressor 16, and flows into the second evaporator 14b. In the second evaporator 14b, the air-conditioning air that has been cooled by the first evaporator 14a is further cooled. Then, the refrigerant that has passed through the second evaporator 14b is drawn into the suction portion 120.

In this example, the refrigerant evaporation pressure of the first evaporator 14a represents a pressure boosted by the diffuser portion 130. On the other hand, an outlet side of the second evaporator 14b is connected to the suction portion 120 of the ejector 100. As a result, the lowest pressure immediately after having been decompressed by the nozzle portion 110 can be exerted on the second evaporator 14b.

Hence, the refrigerant evaporation pressure (refrigerant evaporation temperature) of the second evaporator 14b can be reduced more than the refrigerant evaporation pressure (refrigerant evaporation temperature) of the first evaporator 14a. Therefore, since a temperature difference between the refrigerant in the second evaporator 14b and the air-conditioning air cooled by the first evaporator 14a can be ensured as with a temperature difference between the refrigerant in the first evaporator 14a and the air-conditioning air, the air-conditioning air can be efficiently cooled.

Since the refrigerant evaporation pressure (refrigerant evaporation temperature) can be set to be different between the first evaporator 14a and the second evaporator 14b, objects to be cooled by both of the evaporators 14a and 14b may be different from each other. For example, normal cooling of the air-conditioning air may be conducted in the first evaporator 14a, and air within a refrigerator and a freezer may be cooled in the second evaporator 14b.

Fourth Embodiment

Figure 6:
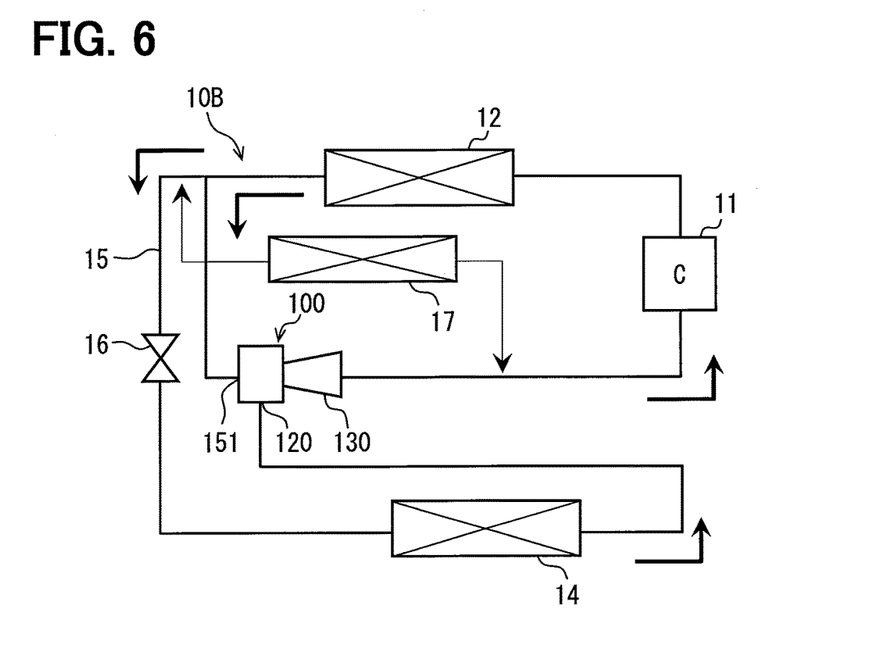
FIG. 6 is a schematic diagram illustrating a refrigeration cycle according to a fourth embodiment of the present disclosure.

A refrigeration cycle 10B according to a fourth embodiment is illustrated in FIG. 6. The refrigeration cycle 10B according to the fourth embodiment eliminates the gas-liquid separator 13 in the refrigeration cycle 10 of the above first embodiment, provides a decompressor 16 and an evaporator 14 in a branch flow channel 15, and adds an internal heat exchanger 17. The ejector 100 of the above first embodiment is used in the refrigeration cycle 10B.

The diffuser portion 130 in the ejector 100 is connected directly to the intake side of the compressor 11. Also, the branch flow channel 15 is formed as a flow channel which branches from between a refrigerant outflow side of the condenser 12 and the inflow portion 151 of the ejector 100, and is connected to the suction portion 120 of the ejector 100. The branch flow channel 15 is equipped with the decompressor 16 as a decompression unit for the refrigerant flowing from the upstream side toward the downstream side, and the evaporator 14.

The internal heat exchanger 17 is a heat exchanger that exchanges heat between a high pressure refrigerant at the upstream side of the decompressor 16 in the branch flow channel 15, and a low pressure refrigerant that flows out of the diffuser portion 130, and formed of, for example, a double-tube heat exchanger. The internal heat exchanger 17 of the double tube type is formed of an outer tube, and an inner tube that is inserted into the outer tube, and for example, the high pressure refrigerant flows in a space between the outer tube and the inner tube, and the low pressure refrigerant flows into the inner tube.

In the present embodiment, a part of the liquid phase refrigerant that flows out of the condenser 12 is adjusted in the flow rate by the flow-rate changeable mechanism 150 of the ejector 100, swirled by the swirl flow channel 140, decompressed by the nozzle portion 110, and also boosted by the diffuser portion 130 and flows out. The refrigerant that flows out of the diffuser portion 130 is drawn into the compressor 11.

Also, the remainder of the liquid phase refrigerant that flows out of the condenser 12 flows into the branch flow channel 15, is decompressed by the decompressor 16, and flows into the evaporator 14. The air-conditioning air is cooled in the evaporator 14. Then, the refrigerant that has passed through the evaporator 14 is drawn into the suction portion 120.

In the internal heat exchanger 17, heat is exchanged between the high pressure refrigerant and the low pressure refrigerant, the high pressure refrigerant is cooled, and the low pressure refrigerant is overheated. That is, the liquid phase refrigerant that has flowed out of the condenser 12 in the branch flow channel 15 is further overcooled by the internal heat exchanger 17, and the lower temperature of the liquid phase refrigerant is promoted (subcooled). Also, the refrigerant that has flowed out of the diffuser portion 130 is overheated by the internal heat exchanger 17 into a gas refrigerant having a superheat degree (superheated).

Hence, since the lower temperature of the refrigerant that flows into the evaporator 14 is promoted, an enthalpy gap in the evaporator 14 can be widen, thereby being capable of improving a heat exchange performance (cooling performance) with the air-conditioning air in the evaporator 14. Since the refrigerant that flows out of the diffuser portion 130 is given the superheat degree by the heat exchange in the internal heat exchanger 17 into a complete gas refrigerant (gas phase refrigerant), liquid compression by the compressor 11 can be prevented.

Other Embodiments

The preferred embodiments disclosed in the present disclosure have been described above. However, the present disclosure is not limited to the above-mentioned embodiments, but can be variously modified without departing from the spirit of the present disclosure.

In the above respective embodiments, the high pressure refrigerant that flows into the swirl flow channel 140 is the liquid phase refrigerant. However, the high pressure refrigerant is not limited to this refrigerant, but may be a gas-liquid two-phase refrigerant. Even if the refrigerant that flows into the swirl flow channel 140 is in the gas-liquid two phase state, an amount of gas phase refrigerant can be made to be larger on the radially inner side than on the radially outer side with respect to the swirl center line due to the swirl flow of the refrigerant in the swirl flow channel 140, and the same effects are obtained in an improvement of the nozzle efficiency.

Also, the ejector 100A in the second embodiment may be applied to the refrigeration cycles 10A and 10B of the third and fourth embodiments.

Also, the refrigeration cycles 10, 10A, and 10B in the above respective embodiments can be applied to a vehicle refrigerator, or a heat pump cycle for domestic water heaters or room air conditioning instead of the above vehicle air conditioning system.

Also, in the above respective embodiments, although the type of refrigerant is not particularly specified, a fluorocarbon refrigerant, an HC-based refrigerant, or a carbon dioxide refrigerant is used, and can be applied to the normal cycle as well as a supercritical cycle and a subcritical cycle.

Figure 7:
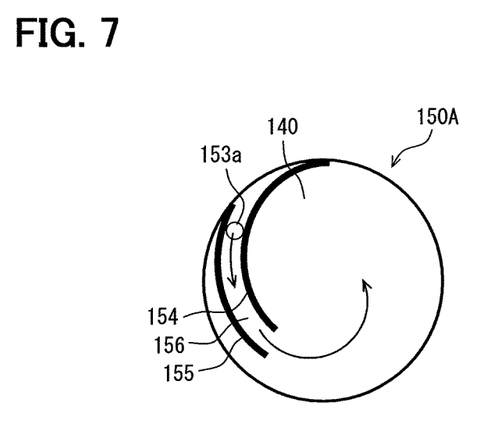
FIG. 7 is a schematic view illustrating a flow-rate changeable mechanism of the ejector corresponding to FIG. 4 in a modification of the present disclosure.

In the above second embodiment, the two inflow holes 153a and two pairs of valve body guides 154 and 155 are provided. However, the number of inflow holes 153a and the number of valve body guides 154 and 155 are not limited to this example. For example, as illustrated in FIG. 7, only one inflow hole 153a may be provided. In this case, one pair of valve body guides 154 and 155 may be provided. Also, inflow holes 153a and valve body guides 154, 155 may be provided.

Also, the second valve body guide 155 may be eliminated, and the first valve body guide 154 may be driven to change the flow rate of the high pressure refrigerant. In this case, the cross-sectional area of the guide flow channel 156 disposed between the inner peripheral surface of the wall that partitions the swirl flow channel 140, and the first valve body guide 154 to change the flow rate of the high pressure refrigerant in the swirl flow channel 140.

What is claimed is:

1. An ejector for a vapor compression refrigeration cycle, comprising:
    a nozzle portion that decompresses and expands a high pressure refrigerant flowing from a high pressure side of the refrigeration cycle;
    a suction portion that draws a low pressure refrigerant lower in pressure than the high pressure refrigerant by a suction force of an ejected refrigerant ejected from the nozzle portion;
    a diffuser portion disposed on a downstream side of the nozzle portion in a refrigerant flow direction, the diffuser portion having a flow channel that gradually enlarges in cross-sectional area toward the downstream side in the refrigerant flow direction, the diffuser portion decelerating a mixed refrigerant of the ejected refrigerant ejected from the nozzle portion and the low pressure refrigerant drawn from the suction portion to increase a pressure of the refrigerant;
    a swirl flow channel swirling the high pressure refrigerant, wherein an outlet of the swirl flow channel is positioned upstream of an inlet of the nozzle portion in the refrigerant flow direction and the refrigerant in a state of a gas-liquid mixed phase flows from the swirl flow channel to the nozzle portion; and
    a flow-rate changeable mechanism disposed on the upstream side of the swirl flow channel in the refrigerant flow direction, the flow-rate changeable mechanism being capable of changing a flow rate of the high pressure refrigerant that flows into the swirl flow channel, wherein
    the flow-rate changeable mechanism includes at least one guide member that protrudes into the swirl flow channel from an inner wall defining the swirl flow channel and extends in a swirl direction of the swirl flow channel, the guide member guiding the high pressure refrigerant flowing into the flow-rate changeable mechanism in the swirl direction of the swirl flow channel,
    the guide member defines a guide flow channel that extends in the swirl direction, the guide member being capable of changing the flow rate of the high pressure refrigerant flowing into the swirl flow channel by changing a cross-sectional area of the guide flow channel,
    the guide member includes a fixed guide and a movable guide,
    the guide flow channel is provided between the fixed guide and the movable guide,
    the movable guide is driven to change a gap between the fixed guide and the movable guide to change the cross-sectional area of the guide flow channel, and
    the fixed guide and the movable guide each extending inward from the inner wall in the swirl flow channel and curved along the swirl direction.

2. The ejector according to claim 1, wherein the swirl flow channel is configured to make a larger amount of gas phase refrigerant present on a radially inner side than on a radially outer side with respect to an imaginary swirl center line by swirling the high pressure refrigerant.

3. The ejector according to claim 1, wherein the high pressure refrigerant is a liquid phase refrigerant.

4. The ejector according to claim 1, wherein the flow-rate changeable mechanism is configured so that the high pressure refrigerant flows into the flow-rate changeable mechanism in parallel to an axis of the nozzle portion.

5. The ejector according to claim 4, wherein the swirl flow channel is arranged between the flow-rate changeable mechanism and the nozzle portion in a direction of the axis of the nozzle portion.

6. The ejector according to claim 1, wherein
    the flow-rate changeable mechanism includes a plurality of fixed guides and a plurality of moveable guides, and the plurality of fixed guides and the plurality of movable guides are arranged along the swirl direction of the swirl flow channel.

7. The ejector according to claim 1, wherein the guide member is located within the swirl flow channel.

8. The ejector according to claim 1, wherein the flow-rate changeable mechanism includes a substrate having a disc shape and located upstream of the guide member, the substrate includes an inflow hole extending through a part of the substrate close to an outer edge of the substrate, and the inflow hole communicates with the guide flow channel.

9. The ejector according to claim 8, wherein the fixed guide and the movable guide extend in the swirl direction and are in contact with the substrate.

10. The ejector according to claim 1, wherein the fixed guide and the movable guide extend radially inward from the inner wall.

\* \* \* \* \*